United States Patent [19]
Weissman et al.

[11] 3,770,507
[45] Nov. 6, 1973

[54] ELECTROCHEMICAL BATTERY EMPLOYING BONDED LEAD DIOXIDE ELECTRODE AND FLUOROBORIC ACID ELECTROLYTE

[75] Inventors: Eugene Yehuda Weissman, Glendale; Guy Douglas McDonald, Shorewood; Conrad Eugene Weinlein, Milwaukee, all of Wis.

[73] Assignee: Globe-Union Inc., Milwaukee, Wis.

[22] Filed: Jan. 24, 1972

[21] Appl. No.: 220,241

[52] U.S. Cl. .................................. 136/26, 136/118
[51] Int. Cl. ..................... H01m 39/00, H01m 17/00
[58] Field of Search ...................... 136/26–27, 6, 64, 154, 155, 9, 118, 3

[56] References Cited
UNITED STATES PATENTS

| | | | |
|---|---|---|---|
| 1,929,357 | 10/1933 | Johnstone | 136/26 |
| 2,677,713 | 5/1954 | Weil et al. | 136/26 |
| 3,060,254 | 10/1962 | Urry | 136/24 |
| 3,069,486 | 12/1962 | Solomon et al. | 136/30 |
| 3,194,684 | 7/1965 | Wells | 136/6 |
| 3,227,583 | 1/1966 | Carlisle | 136/6 |
| 3,318,794 | 5/1967 | Kiyohara et al. | 204/290 |
| 3,488,218 | 1/1970 | Metzler et al. | 117/201 |
| 3,496,020 | 2/1970 | Jackson et al. | 136/26 |
| 3,629,007 | 12/1971 | Kilduff | 136/27 |
| 3,173,809 | 3/1965 | Hall | 136/19 |

Primary Examiner—Anthony Skapars
Attorney—John Phillip Ryan et al.

[57] ABSTRACT

A lead dioxide electrode structure for an electrochemical battery employing fluoroboric acid as an electrolyte is formed from lead dioxide particles, a bonding material and preferably a synthetic fibrous material. The bonding and fibrous materials are mixed with the lead dioxide particles to form a compact and homogeneous electrode structure. The bonding and fibrous materials are partially resistant to the fluoroboric acid and are compatible with each other. The battery formed from the electrode structure is operable at temperatures as low as minus 60° centigrade and at temperatures as high as plus 100° centigrade and can be custom made to provide a variety of steady or pulsed current discharges.

11 Claims, 6 Drawing Figures

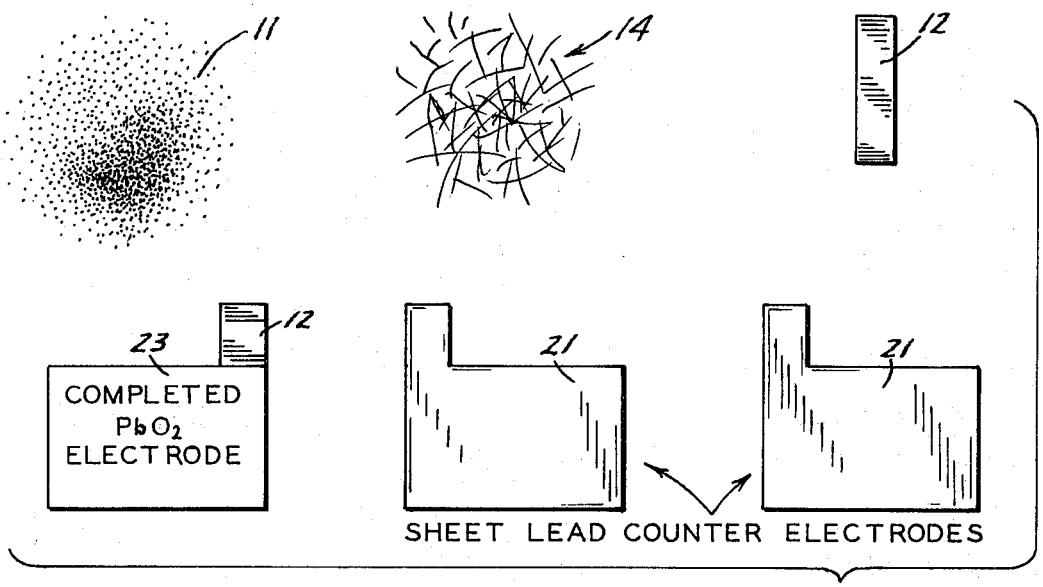
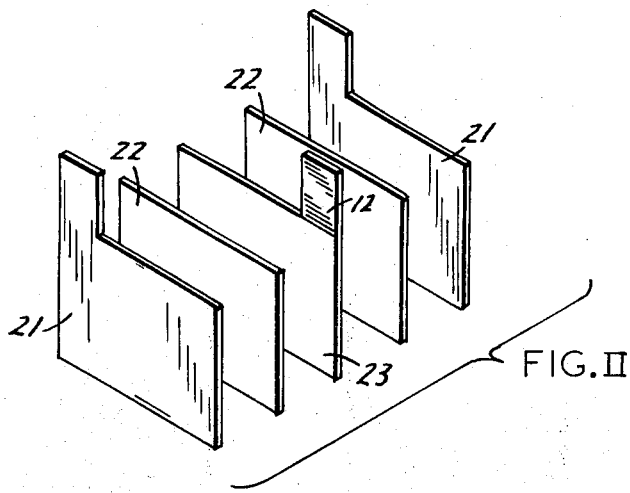
FIG. I
FIG. II
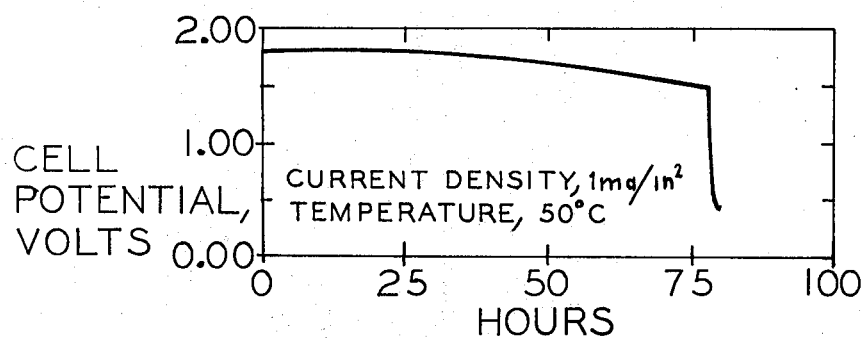
FIG. III

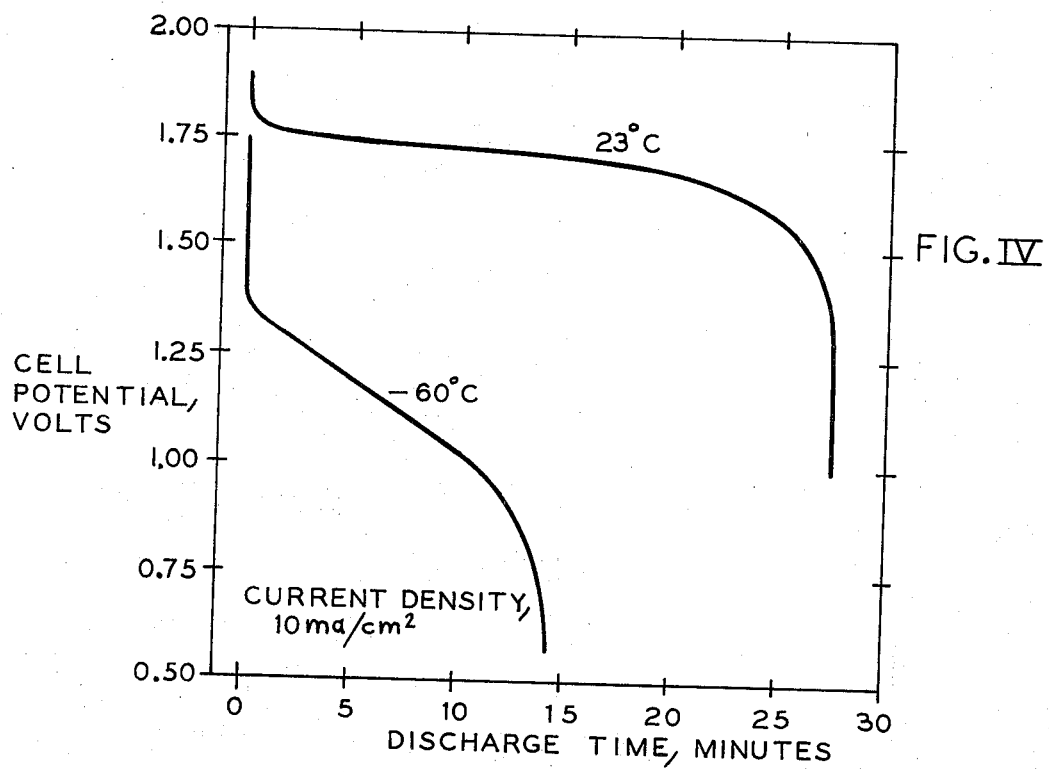
FIG. IV
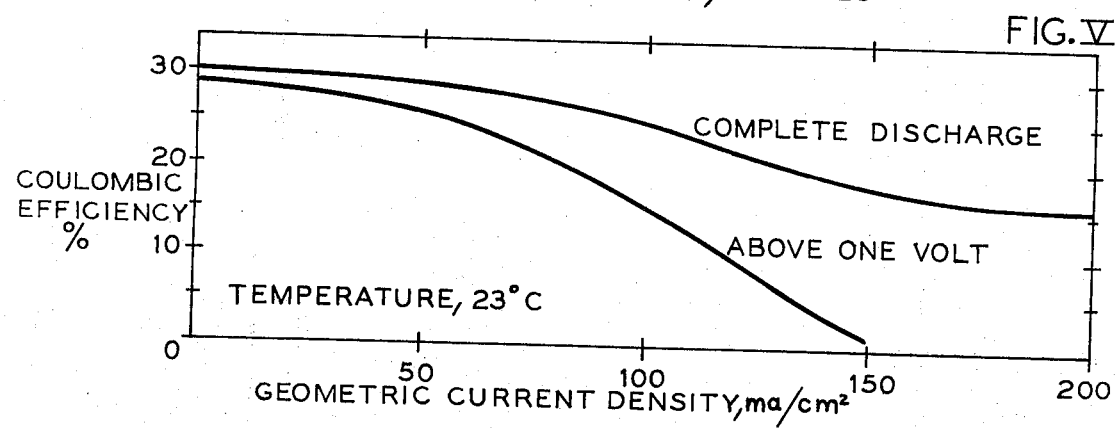
FIG. V
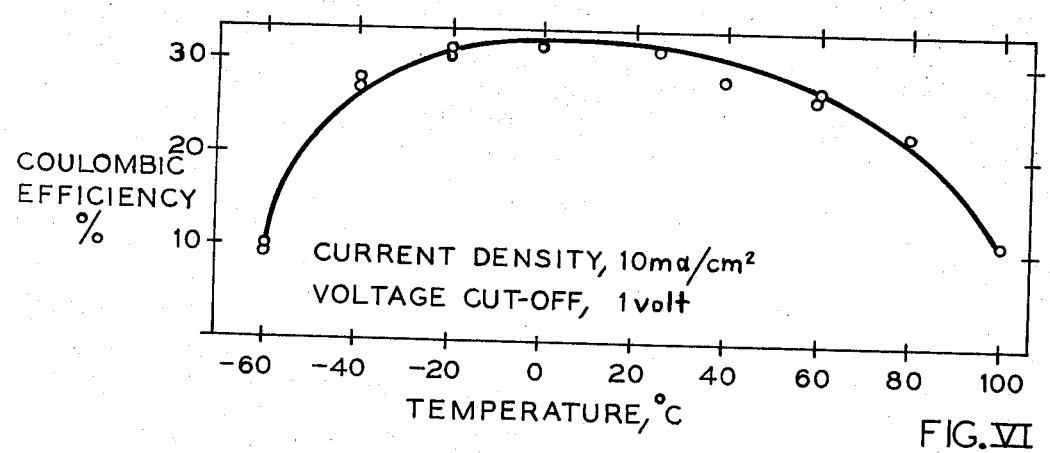
FIG. VI

ELECTROCHEMICAL BATTERY EMPLOYING BONDED LEAD DIOXIDE ELECTRODE AND FLUOROBORIC ACID ELECTROLYTE

BACKGROUND OF THE INVENTION

This invention relates to a primary battery of the reserve type and more particularly, to a primary battery for use with fluoroboric acid as an electrolyte employing particular types of bonding materials and synthetic fibers to form an electrode structure.

Electrodes formed from bonding lead dioxide with resinous materials are described in U.S. Pat. No. 3,318,794. The electrodes therein described are stated to be useful as anodes for oxidation electrolysis. Reserve battery electrodes using bonded active materials are reviewed in an article published by T. J. Kilduff and E. F. Horsey in the 24th Power Sources Symposium 1970 proceedings of May 19 through May 21 P30-35. The reserve battery therein described is proposed for use with fluoroboric acid as an electrolyte and the electrode therein described consists of a steel shim substrate coated with a conductive material which in turn is overlaid with a coating of lead dioxide in a resinous matrix. The prior art nowhere describes a reserve battery employing fluoroboric acid as an electrolyte which will operate at both low and, particularly, high temperatures for long periods of time. Neither is there available a reserve battery which utilizes a fluoroboric acid electrolyte which can be formed without a metallic substrate for the cathode.

It is an object of the present invention to provide a novel primary reserve battery which is operable for substantial periods of time over a wide temperature range. It is another object of this invention to provide a reserve battery employing fluoroboric acid as an electrolyte in which the metallic substrate for the cathode can be eliminated. It is still another object of the present invention to provide an electrode structure for use in contact with fluoroboric acid which is readily adaptable for use in both high rate and low rate type batteries. It is still another object of this invention to provide a novel reserve type battery which has wide temperature ranging capabilities and can be produced at low cost.

SUMMARY OF THE INVENTION

The foregoing objects are accomplished and the shortcomings of the prior art are overcome by the present electrochemical battery electrode which is comprised of lead dioxide uniformly mixed with a bonding material and preferably a synthetic fibrous material. Both the bonding and fibrous materials are partially or totally inert to fluoroboric acid yet are compatible with each other and with the lead dioxide in that good cohesion is afforded yet access to the lead dioxide is afforded the fluoroboric acid electrolyte through selective consumption of the lead dioxide active material. The combined bonding and fibrous materials form a matrix for the lead dioxide which in itself is self-sustaining or can be composited with a metallic or non-metallic grid or substrate.

BRIEF DESCRIPTION OF DRAWINGS

A better understanding of the present battery electrode will be accomplished by reference to the drawing wherein:

FIG. I is a diagrammatic view showing the component parts of the novel electrode structure for an electrochemical battery.

FIG. II is a perspective view of a battery fabricated with the electrode structure.

FIG. III is a performance graph showing the voltage discharge for a battery having an electrode composed of lead dioxide, a bonding material, and synthetic fibrous material.

FIG. IV is a graph illustrating discharge curves for the battery of this invention at minus 60°C and plus 23°C.

FIG. V shows the effect of discharge rate on the coulombic efficiency (which is available capacity) of the lead dioxide electrode of this invention.

FIG. VI illustrates the effect of temperature on the coulombic efficiency of a battery fabricated with the novel electrode.

DESCRIPTION OF THE PREFERRED EMBODIMENT

In the following Examples, certain bonding and fibrous materials will be referred to by their trademarks or by abbreviation. All of the materials are readily available on the commercial market and a brief explanation of them is given:

| NAME | PRODUCT | SOURCE |
| --- | --- | --- |
| Geon 222, 421 and 427 | Vinyl chloride/ Vinyl acetate copolymer | B.F. Goodrich Co. |
| Dynel | Vinyl chloride/ acrylonitrile copolymer | Union Carbide Corp. |
| Dow Corning 107 | Silicone grease | Dow Corning |
| Carbowax 20M & 6,000 | Low molecular wt. ethylene oxide polymer | Union Carbide Corp. |
| Polyox WSR-301 | High molecular wt. ethylene oxide polymer | Union Carbide Corp. |
| QP-4400 & 52,000 | Hydroxyethyl cellulose | Union Carbide Corp. |
| VMCH | Vinyl chloride/ vinylacetate copolymer | Union Carbide Corp. |
| PA-4459 | Thermoplastic adhesive | Minn. Mining & Mfg. Co. |
| T-30 | Tetra fluoroethylene dispersion | Dupont |

The invention is disclosed in further detail by means of the following examples which are set forth for the purpose of illustrating the invention, but, in no way are to be considered as limiting the invention to the precise amounts, ingredients, or conditions indicated.

EXAMPLE I

A 10 percent by weight solution of Geon 421 in methylethylketone is prepared by employing 6.0 grams of Geon 421 in 54.0 grams of methylethylketone by suitable stirring and mixing. Lead dioxide of the Fisher technical grade type and in an amount of 194 grams is dried at 100°C. under reduced pressure (e.g. 150 mm Hg absolute). The dried lead dioxide and the Geon solution are hand-mixed for 30 minutes and the methylethylketone is subsequently removed under high vacuum (e.g. 10 microns absolute pressure) and with a cold trap at room temperature. Any large pieces of material are broken up every hour for 3 hours and the resulting material evacuated overnight at 60°C. Subsequently, the resulting mixture is reduced to a fine powder by cooling to liquid nitrogen temperature and blending for 10 seconds. The cooled material is sifted through a 140 mesh screen using a sonic sifter with an amplitude of five and a pulse rate of six over a time of 5 minutes. The sifted material is then heated to 100°C with 10 microns pressure for 2 hours and subsequently stored in a dessicator. This material is illustrated in the drawing as 11.

EXAMPLE II

A current collector tab 12 is next formed by cutting expanded nickel grid to form a rectangular tab of 0.25 inches by 1 inch. The nickel tab is cleaned by dipping in tricholoroethylene followed by a methanol rinse.

EXAMPLE III

An electrode structure 23 is fabricated by mixing 0.20 grams of Dynel fibres 14 with 19.8 grams of the coated lead dioxide mixture 11 formed in Example I to form a 1 weight percent Dynel mixture. A single action die is coated with Dow Corning 107 compound release agent and the die is loaded by adding one gram of the lead dioxide-Geon mix to the die and leveled. The nickel tab 12 described in Example II is inserted and 4 grams of the lead dioxide mixture containing the fibres is added to the die and is leveled also. The die plunger is next inserted in a careful manner and the die placed in a Carver type press, preheated to 120°C. and allowed to warm under 2,000 lb. load until the die reaches 120°C. A press load of 20,000 lbs. is applied for six minutes at 120°C. and the die subsequently transferred to cold press and allowed to cool under minimum clamping pressure of approximately 600 lbs. The grid structure 23 is removed from the die and the tab 12 is coated with a methylethylketone solution of 10w% Geon.

As shown in FIG. II, the formed electrode structure 23 is assembled into a battery unit by positioning it between two lead electrodes 21. Shorting of the battery is prevented by placing separators 22 between the plates. A battery is fabricated in the normal manner by interconnecting several of the grid structures, electrodes 21 and separators 22 in a battery casing (not shown) with the fluoroboric acid electrolyte.

If it is desired to utilize a well known nickel grid for a substrate and a current collector, this can be effected in accordance with the following Examples.

EXAMPLE IV

A Geon coated lead dioxide, Dynel matrix mixture is prepared as indicated in EXAMPLES, I, II, and III.

EXAMPLE V

A metal grid substrate is formed by cutting expanded metal nickel grid to fit a die cavity 1 inch by 1½ inches with a ½ inch by ¼ width tab.

The nickel grid is cleaned by dipping sequentially in the following solutions: trichloroethylene, 50 percent nitric acid, distilled water, trichloroethylene, methanol.

The cleaned grid is passivated by cathodizing in a 3 percent nitric acid solution at room temperature and at 129 ma/in$^2$ for 10 seconds using nickel coated electrodes. Anodizing is effected in the same indicated solution for passivating using 516 ma/in$^2$ for 3 seconds followed by a 30 second treatment at 129 ma/in$^2$. The anodized material is rinsed in distilled water.

Beta lead dioxide is plated on the passive nickel grid by anodizing the nickel grid at 129 ma/in$^2$ for 4 minutes with lead coated electrodes in a plating solution composed of 240 grams of L-G2 lead nitrate dissolved in distilled water to make a 500 ml solution. L-G2 lead nitrate is available from Fisher Scientific Company. The plated electrodes are rinsed in distilled water using a standard air drier.

EXAMPLE VI

An electrode structure is formed using the lead dioxide, resinous bonding and fibrous materials prepared in Examples IV & V by loading a die of the single action type which is previously coated with Dow Corning 107 release agent with 0.5 grams of the lead dioxide, resinous and fibrous materials mixture and the material leveled in the die. The lead dioxide plated nickel grid is inserted in the die and 0.5 grams of the mixture is added and leveled. The plunger is inserted carefully and the die placed in a Carver type press and preheated to 120°C. and allowed to warm up under a 2,000 pound load until temperature of die reaches 120°C. which usually takes approximately ten minutes. The press is operated at a 16,000 pound load for 20 minutes at 120°C. The die is subsequently transferred to cold press and allowed to cool under minimum clamping pressure of 600 pounds. The electrode is then removed from the die and the tab coated with a 10 percent Geon solution.

As indicated, earlier, a battery can be fabricated from the electrode structure prepared in Examples IV, V & VI by following the previous procedures for battery fabrication shown in FIG. II.

In the preceding Examples, Geon 421 is listed as the preferred bonding material. As shown in Table I it has been found that other resins and some waxes such as carbowax can be employed. The important aspect of the bonding material being that it must have good cohesion with the lead dioxide as well as with the fibrous materials and possibly chemically react in a favorable way with the fibrous material. Further, it and the fibrous material must be combined with the lead dioxide active material so as to permit a sustained exposure of the lead dioxide to the electrochemically reacting fluoroboric acid. The unexpected performance of the bonding materials is evidenced by the fact that several of them which were tried either failed completely or certain percentage mixtures of them could not be utilized. For example, PA-4,459 in a 2w% solution, Polyox WSR-301 in a 3w% solution could not be utilized to advantage, nor could WSR-301 + QP-4,400 WSR-301 + QP-52,000 or carboxymethyl cellulose. Further polyvinyl alcohol, T-30 (Teflon dispersion) and Carbowax 20M below 5w% could not be utilized to advantage.

Dynel is an example of a preferred material for forming the fibrous matrix. However, carbon fibres or mixtures with Dynel could be employed while glass fibers or cellulose fibers cannot be used.

The invention is further exemplified by illustrating certain variables regarding amounts of materials and conditions in Table II for practicing the invention in accordance with the teachings in the Examples.

Concerning the separators 22 employed in fabricating a battery, polyvinyl chloride and Dynel felt are examples of preferred materials. Polyethylene, cellulosives, rubber, and microporous glass could not be utilized. In the so called high rate electrode as exemplified in Examples IV—VI having a metallic substrate (grid), lead dioxide plated nickel is an example of a preferred material for the substrate, with nickel being the second choice, and copper and lead being the less preferred, in that order.

As indicated in the Examples and Table II a ratio of bonding material to fibrous material is 4 to 1. However, this ratio can be extended to include a range of 1 to 4 for the bonding material and 0.25 to 1 for the fibres as based on a weight percentage.

Hot pressing is utilized in the Examples for fabricating the electrode structure. However, this is only one means of mechanically fabricating. Heated rollers or a heated substrate could be utilized in which case the material composed of the lead dioxide, the bonding and fibrous materials is heated and simultaneously or subsequently compacted. The heat may be supplied externally to the fixture used to form the electrode or it may be generated in situ via heat generated from frictional forces (e.g. such as created by rolling powder between two rolers moving at different rates), ultrasonic energy, impacting, microwave radiation, etc. Electrodes could also be prepared by exposing the powder, composed of the lead dioxide, the bonding and fibrous materials, to organic fumes (such as methylethylketone) so as to make the plastic binder material tacky and then compacting the treated powder. The solvent vapor could subsequently be removed either by heating and/or using reduced pressure. A further approach would be to apply a slurry of $PbO_2$-Geon binder and methylethylketone to a solid substrate (using a variety of thick filming techniques such as a doctor blade, silk screen, etc.) removing the methylethylketone and hot rolling the resulting stock to increase electrode density.

As shown by the chart in FIG. III of the drawing, a battery formed from the electrode structure composed of the bonding and fibrous materials with the lead dioxide particles operates over a period of 80 hours with a voltage ranging between 1.5 and 2.0 volts and at a temperature of 50 °C. Performance ranges are shown in Table III and FIGS. III, IV, V, and VI which indicates the long life, efficiency, and durability of the novel electrode structure. Prior to this invention, this has not been accomplished where fluoroboric acid is utilized as an electrolyte. This is accomplished by the unique combination of bonding and fibrous materials for forming a matrix for the lead dioxide.

It will thus be seen that through the present invention there is now provided an electrode structure for an electrochemical battery which employs fluoroboric acid as an electrolyte having steady current flow at high and low temperatures and over substantial periods of time. The novel electrode structure is easily fabricated with no special precautions needed to be taken during fabrication. The electrode structure is not only self-sustaining but can be utilized with a metal grid or other suitable conductive backing thus making it available for use as a high rate lead dioxide electrode as well as a low rate one.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

TABLE I

| Binder type | Percent by wt | Bonding conditions p.s.i. | °F | Cohesion | Voltage peak (volts) | @ 50 ma/in² minimum | Voltage peak (volts) | @ 100 ma/in² minimum | Voltage peak (volts) | @ 850 ma/in² minimum | Electrode density g/cc |
|---|---|---|---|---|---|---|---|---|---|---|---|
| Carbowax 20.M | 7 | 7,000 | 250 | Good | 1.75 | 1.74 | | | | | 4.95 |
| Carbowax 20.M | 10 | 7,000 | 250 | Good | 1.64 | 1.58 | 1.50 | 1.47 | ≅0 | | 5.17 |
| Carbowax 6,000 | 7 | 7,000 | 250 | Good | 1.77 | 1.76 | 1.69 | 1.67 | 1.25 | ≅0 | 5.48 |
| Polyox WSR-301 | 4 | 7,000 | 250 | Good | 1.79 | 1.78 | 1.71 | 1.68 | 1.51 | ≅0 | 4.89 |
| Polyox WSR-301 | 5 | 7,000 | 250 | Good | 1.76 | 1.76 | 1.68 | 1.67 | 1.10 | ≅0 | 4.84 |
| QP-4400 | 5 | 7,000 & 0 | 200 & room | Good @ 7,000 p.s.i. | 1.63 | 1.65 | 1.52 | 1.42 | ≅0 | | 4.84 |
| QP-52,000 | 5 | 7,000 & 0 | 200 & room | Good @ 7,000 p.s.i. | 1.49 | 1.44 | 1.21 | ≅0 | | | 5.10 |
| Geon 222 | 3 | 7,000 | 350 | Good | 1.76 | 1.70 | 1.64 | 1.49 | ≅0 | | 5.95 |
| Geon 427 | 3 | 7,000 | 350 | Good | 1.80 | 1.71 | 1.66 | 1.58 | 1.05 | 0.70 | 5.86 |
| G 427 | 4 | 7,000 | 350 | Good | 1.74 | 1.70 | 1.63 | 1.51 | ≅0 | | 5.72 |
| VMCH | 3 | 7,000 | 350 | Good | 1.73 | 1.53 | 1.40 | 1.00 | ≅0 | | 6.01 |
| VMCH | 4 | 7,000 | 350 | Good | 1.62 | 1.58 | 1.32 | ≅0 | | | 5.78 |
| PA-4, 459 | 3 | 7,000 | 400 | Excellent | 1.30 | 1.23 | 0.80 | 0.79 | 0.40 | ≅0 | 5.98 |
| T-30+20M | 5/5 | 7,000 | 400 | Good | 1.67 | 1.60 | 1.45 | ≅0 | | | 4.98 |
| WSR-301+20M | 3.5/3.5 | 7,000 | 250 | Good | 1.75 | 1.72 | 1.65 | 1.00 | ≅0 | | 5.07 |

TABLE II

BONDED LEAD DIOXIDE ELECTRODE RANGES

| VARIABLE | RANGE MIN. | MAX. | OPT. | UNITS |
|---|---|---|---|---|
| FABRICATION | | | | |
| Pressure | 10,000* | 20,000 | 16,000 | Load (lbs. per 1.5 in²) |
| Pressing Temp. | 90* | 150* | 120 | °C. |
| PbO₂ Particle Range | 37 | 250* | | Microns |
| Composition | | | | |
| Binder (Geon) | 3 | 4 | 3 | w/% |
| Additives | | | | |
| Nickel Powder | | 4 | | w/% |
| Carbon Powder | 2 | 4* | 0 | w/% |
| Fibres | 1 | 5* | 1 | w/% |
| Dynel | ¼ | 1 | 1 | w/% |
| Uncoated PbO₂ | 0 | 50 | 15 | w/% |
| Solka Floc | 0 | 5 | 0 | w/% |
| ELECTRODE DIMENSIONS | | | | |
| Low Rate Electrode | | | | |
| Weight | 2 | 6.0 | 5.4 | grams per electrode |
| Thickness | 0.600 | | | mm |
| High Rate | | | | |
| Weight | 1.00 | 1.90 | 1.80 | grams per electrode |
| Thickness | 0.370 | 0.578 | 0.484 | mm |
| Electrolyte | 1 | >3 | 1.5 | ml per cell |

*absolute limit—above max. range or below min. range electrodes could not be made.

TABLE III

PERFORMANCE

| HIGH RATE ELECTRODE | RANGE MIN. | MAX. | OPT. | UNITS |
|---|---|---|---|---|
| Current | 0.1 | 300 | 20 | ma/cm² |
| Temperature | −60 | 100 | 10 | °C. |
| Activated Stand at RT | | 72 | less than 24 | Hours |
| LOW RATE ELECTRODE | | | | |
| Current | 0.1 | 0.5 | 0.1 | ma/cm² |
| Activated Stand at 50°C. | 10 | 79 | ~48 | Hours |

We claim:

1. An electrochemical primary battery comprising: a metallic anode; fluoroboric acid as an electrolyte and a cathode composed of lead dioxide particles and a bonding material for said lead dioxide particles, said bonding material being compactly and homogeneously mixed to form an electrode structure, said lead dioxide being substantially uniformly mixed with said bonding material, said bonding material being compatible with said lead dioxide making the lead dioxide accessible to and consumable by said fluoroboric acid, while being at least partially inert to said fluoroboric acid.

2. The electrochemical battery as defined in claim 1 further including a synthetic fibrous material, said fibrous material being compactly and homogeneously mixed with said lead dioxide and said bonding material, said fibrous material being compatible with said lead dioxide making the lead dioxide accessible to and consumable by said fluoroboric acid, while being at least partially inert to said fluoroboric acid.

3. The electrochemical battery as defined in claim 2 wherein said metallic anode comprises two metallic lead anodes with insulating separators between said anodes and said electrode structure.

4. The electrochemical battery as defined in claim 2 wherein said bonding material is a resin and the ratio of resinous material to fibrous material is in the range of 1 to 4 and 0.25 to 1 as based on a weight percentage.

5. The electrochemical battery as defined in claim 2 wherein said fibres are composed of a vinyl chloride-acrylonitrile copolymer resin.

6. The electrochemical battery as defined in claim 2 wherein said fibres are an equal mixture of carbon and a vinyl chloride-acrylonitrile copolymer resin.

7. The electrochemical battery as defined in claim 3 further including a metallic substrate for said cathode comprising a lead dioxide plated nickel.

8. The electrochemical battery as defined in claim 3 wherein said insulating separators are polyvinyl chloride or a vinyl chloride-acrylonitrile copolymer felt resin.

9. The electrochemical battery as defined in claim 2 wherein said bonding material is a vinyl chloride-vinyl acetate resin.

10. The electrochemical battery as defined in claim 2 wherein the ratio of said bonding material to said fibrous material is approximately 4 to 1 as based on a weight percentage.

11. The electrochemical battery as defined in claim 7 wherein said battery is composed of several cells of said anodes and cathodes and fluoroboric acid is present in an amount of approximately 1.5 milliliters per cell.

* * * * *